US008813559B2

(12) United States Patent
Welle et al.

(10) Patent No.: US 8,813,559 B2
(45) Date of Patent: Aug. 26, 2014

(54) DETERMINATION OF MEDIA CHARACTERISTICS IN FILL-LEVEL MEASURING

(75) Inventors: Roland Welle, Oberwolfach (DE); Karl Griessbaum, Muehlenbach (DE)

(73) Assignee: VEGA Grieshaber KG, Wolfach (DE)

( * ) Notice: Subject to any disclaimer, the term of this patent is extended or adjusted under 35 U.S.C. 154(b) by 359 days.

(21) Appl. No.: 13/312,067

(22) Filed: Dec. 6, 2011

(65) Prior Publication Data

US 2012/0324994 A1 Dec. 27, 2012

Related U.S. Application Data

(60) Provisional application No. 61/423,792, filed on Dec. 16, 2010.

(30) Foreign Application Priority Data

Dec. 16, 2010 (WO) ................. PCT/EP2010/069984

(51) Int. Cl.
*G01F 23/28* (2006.01)
*G01F 23/296* (2006.01)
*G01F 23/284* (2006.01)

(52) U.S. Cl.
CPC .......... *G01F 23/284* (2013.01); *G01F 23/2962* (2013.01)
USPC ........................................................ 73/290 V

(58) Field of Classification Search
USPC ........................................................ 73/290 V
See application file for complete search history.

(56) References Cited

U.S. PATENT DOCUMENTS

| | | | | |
|---|---|---|---|---|
| 4,364,273 A | | 12/1982 | Redding | |
| 4,924,700 A | * | 5/1990 | Habart | 73/290 V |
| 5,076,100 A | * | 12/1991 | Hunter et al. | 73/290 V |
| 5,457,990 A | * | 10/1995 | Oswald et al. | 73/290 V |
| 5,651,286 A | * | 7/1997 | Champion et al. | 73/290 V |
| 5,656,774 A | * | 8/1997 | Nelson et al. | 73/290 V |
| 5,717,383 A | * | 2/1998 | Dreyer et al. | 340/621 |
| 6,987,393 B2 | * | 1/2006 | Jean et al. | 324/644 |
| 7,965,087 B2 | | 6/2011 | Reimelt et al. | |
| 2002/0026828 A1 | * | 3/2002 | Fehrenbach et al. | 73/290 V |

FOREIGN PATENT DOCUMENTS

| | | |
|---|---|---|
| DE | 10 2006 019191 | 10/2007 |
| EP | 1 906 158 | 4/2008 |
| FR | 2 751 744 | 1/1998 |
| WO | 2006/103200 | 10/2006 |
| WO | 2008/132470 | 11/2008 |
| WO | 2010/040580 | 4/2010 |
| WO | 2010/071564 | 6/2010 |

* cited by examiner

*Primary Examiner* — John Fitzgerald
(74) *Attorney, Agent, or Firm* — Fay Kaplun & Marcin, LLP

(57) ABSTRACT

For calculating the fill level in a container two echo curves are acquired that image the reflection conditions along two different measuring paths. On their way to the filling material surface or the separating layer surface the corresponding measuring signals cover different electrical distances. From the two echo curves a characteristic value can be calculated that reflects a physical characteristic of the covering medium. From this, the fill level can then be determined with increased accuracy.

12 Claims, 9 Drawing Sheets

112 101 804 802 $\varepsilon_D$ A B 801 803 805 804 106 108

DETERMINATION OF MEDIA CHARACTERISTICS IN FILL-LEVEL MEASURING

REFERENCE TO RELATED APPLICATIONS

This application claims the benefit of the filing date of PCT Patent Application Ser. No. PCT/EP2010/069984 filed 16 Dec. 2010 and U.S. Provisional Patent Application Ser. No. 61/423,792 filed 16 Dec. 2010, the disclosure of both applications is hereby incorporated by reference.

TECHNICAL FIELD

The invention relates to the determination of media characteristics in measuring fill levels of all kinds. In particular, the invention relates to a fill-level measuring device that operates according to a transit time method, to a fill-level measuring arrangement, to its use, and to a method for fill-level measuring.

BACKGROUND INFORMATION

In fill level sensors operating according to the FMCW method or pulse-transit time method electromagnetic or acoustic waves are emitted in the direction of a feed material surface (in the following also referred to as “filling material surface”). Subsequently a sensor records the echo signals reflected by the feed material, (in the following also referred to as “filling material”), the container internals and the container itself, and from them derives the respective fill level.

Fill level sensors operating according to a transit time method may, for example, comprise sensors which determine the distance to a feed material surface with the use of ultrasound, radar, guided radar, FMCW radar, pulse-burst radar, CW radar or laser. Furthermore, all the sensors that emit a wave and subsequently receive and evaluate the components of said wave that are reflected by a feed, i.e. filling, material surface may be defined as fill level sensors that operate according to a transit time method.

In the use of acoustic or optical waves the signal generated by the fill-level measuring device generally speaking propagates freely in the direction of the feed material surface to be measured. In the case of devices that use radar waves for measuring the feed material surface, both free propagation in the direction of the medium to be measured, and propagation in the interior of a waveguide that guides the radar waves from the fill-level measuring device to the medium can be considered. In the case of devices according to the principle of the guided microwave the high-frequency signals are guided along a waveguide towards the medium.

On the surface of the medium to be measured some of the incoming signals are reflected, and after a corresponding transit time return to the fill-level measuring device. The non-reflected signal components enter the medium and propagate in it, according to the physical characteristics of the medium, in the direction of the container bottom. These signals are reflected by the container bottom and, after passing through the medium and the overlaid atmosphere, return to the fill-level measuring device.

The fill-level measuring device receives the signals reflected on various locations, and from them determines the distance to the feed material according to known methods.

The determined distance to the feed material is provided towards the outside. The provision can be implemented in analog form (4.20 mA interface) or in digital form (field bus).

The fundamental design of radar fill-level sensors is described in detail in the book by Peter Devine “Füllstandsmessung mit Radar. Leitfaden für die Prozessindustrie” (ISBN 3-00-008216-6).

It has been found that fill-level measuring results that are based on radar fill-level sensors are often not accurate.

DE 10 2006 019 191 A1, WO 2010/071564 A1 and WO 2006/103200 A1 describe methods for fill-level measuring that are intended to improve accuracy.

SUMMARY OF THE INVENTION

Stated are a fill-level measuring device that operates according to a transit time method, a fill-level measuring arrangement, the use and a method for fill-level measuring.

According to a first aspect of the invention, a fill-level measuring device that operates according to a transit time method is stated, which fill-level measuring device comprises an echo-curve acquisition device and an evaluation device. The echo-curve acquisition device is used to acquire a first and at least one second echo curve. In this arrangement the first echo curve represents the reflection conditions along a first measured line, i.e. along a first measuring path, along which a first measuring signal generated by the fill-level measuring device propagates or moves towards a feed material surface and/or a separating layer surface. The second echo curve forms the reflection conditions along a second measured line, i.e. along a second measuring path along which a second measuring signal, generated by the fill-level measuring device, moves towards a feed material surface and/or separating layer surface.

In this arrangement the two measuring signals require different transit times to reach the feed material surface because they have to cover different electrical distances on their way to the feed material surface. These different electrical distances result, for example, from a different physical distance or partially different propagation speeds of the two measuring signals on their way along the corresponding measured line, i.e. along the corresponding measuring path.

The evaluation unit is designed for evaluating the first and the second echo curve in order to, from them, calculate at least one characteristic value relating to an overlay medium, i.e. a covering medium, that is situated above the feed material surface and/or the separating layer surface.

This overlay medium is, for example, a second, lighter liquid, steam or a gas or gas mixture.

According to one embodiment of the invention, the first measured line and the second measured line comprise different (physical) lengths. This may be implemented in that two antennae are provided that are arranged offset relative to each other at different heights in the container. This can also be implemented in that the two measuring signals are fed to the feed material surface and/or to the separating layer surface along paths of different length, thus travelling different distances in the overlay medium.

According to a further embodiment of the invention, the echo-curve acquisition device comprises a first fill-level probe for generating the first echo curve and a second fill-level probe for generating the second echo curve.

It is also possible for a single fill-level probe to be provided that is utilized for generating both echo curves, which are then, however, fed along different paths to the feed material surface (and back).

According to a further embodiment of the invention, the at least one characteristic value is selected from the group comprising permeability, permittivity, pressure, temperature, and degree of saturation of the overlay medium.

According to a further embodiment of the invention, the echo-curve acquisition device further comprises a first waveguide and a second waveguide. The first measured line extends along the first waveguide, and the second measured line extends along the second waveguide, whose physical length differs from that of the first waveguide.

According to a further embodiment of the invention, the evaluation device is designed for calculating the product of permittivity and permeability of the overlay medium above the feed material surface and/or separating layer surface in order to, by means of this result, subsequently determine the position of the feed material surface or the position of the separating layer.

According to a further embodiment of the invention, the echo-curve acquisition device comprises a first waveguide and a second waveguide. The first measured line extends along the first waveguide, and the second measured line extends along the second waveguide, whose physical length is identical to that of the first waveguide.

According to a further embodiment of the invention, the second waveguide comprises a dielectric material so that the transit time of the second measuring signal along the second measured line is prolonged (when compared to a corresponding waveguide of the same length but without a dielectric material).

In this manner it is possible for the two signals to comprise different transit times although the physical distance which they cover to the feed material is identical.

According to a further embodiment of the invention, the echo-curve acquisition device comprises a single coaxial waveguide for guiding the two measuring signals, wherein the first measuring signal is guided along the outer surface of the coaxial waveguide, and wherein the second measuring signal is guided in the interior of the coaxial waveguide.

According to a further embodiment of the invention, the interior of the coaxial waveguide is at least in part covered by means of a dielectric material when the transit time of the second measuring signal along the second measured line is longer than the transit time of the first measuring signal along the first measured line.

According to a further embodiment of the invention, the first and/or the second measuring signal is an electromagnetic signal or an acoustic signal.

Thus fill-level radars or ultrasound devices or devices operating according to the principle of the guided microwave can be considered for use as fill-level measuring devices.

According to a further aspect of the invention, a fill-level measuring arrangement for measuring the fill level in a container is stated, which fill-level measuring arrangement comprises a fill-level measuring device described above and below, and a container for receiving a feed material whose fill level is to be determined by the fill-level measuring device.

The fill-level measuring device is, for example, at least in part, situated in the interior of the container.

According to a further aspect of the invention, the use of a fill-level measuring device, described above and below, for determining the product of permittivity and permeability of an overlay medium above the feed material surface and/or the separating layer surface is stated.

According to a further aspect of the invention, a method for fill-level measuring is stated in which a first and at least one second echo curve are acquired, and these two echo curves are evaluated in order to, from them, calculate at least one characteristic value relating to an overlay medium that is situated above the feed material surface and/or the separating layer surface. This method can, for example, be implemented by means of a fill-level measuring device described above and below.

At this stage it should be pointed out that characteristics which are described below with reference to the fill-level measuring device can also be implemented as method-related steps in the method, and vice versa.

DETAILED DESCRIPTION OF EXEMPLARY EMBODIMENTS

Figure 1:
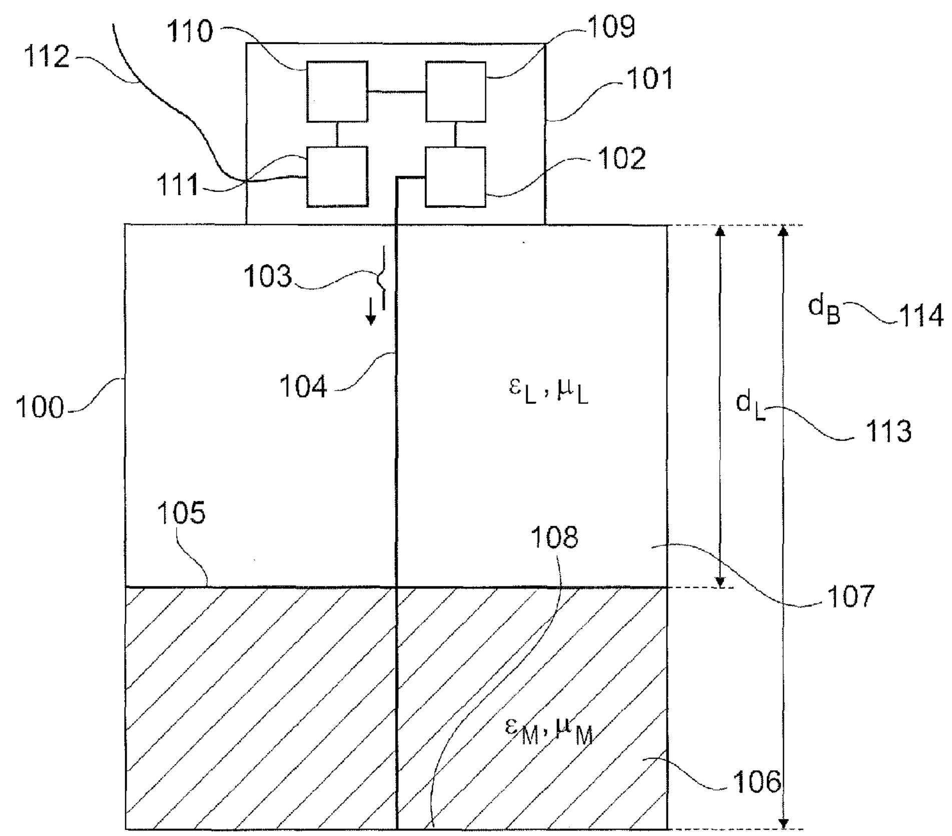
FIG. 1 shows an arrangement for fill-level measuring.

If in the following description of the figures in various figures the same reference characters are used, these describe identical or similar elements. However, identical or similar elements can also be designated by different reference characters.

All the methods share a common feature in that the signals used for measuring, on their way from the fill-level measuring device to the feed material surface and/or separating layer surface, are normally in the field of influence of a further medium that hereinafter is referred to as the overlay or covering medium.

An overlay medium is a medium or a mixture of different media that is situated between the emitting position of the measuring signal of the fill-level measuring device (for example the antenna of the fill-level measuring device) and the surface of the medium to be measured, or between the emitting position of the measuring signal of the fill-level measuring device (for example the antenna of the fill-level measuring device) and a separating layer surface that forms between two fluids. Generally speaking the overlay medium is represented by a liquid or by a gaseous atmosphere.

In the predominant number of applications there is air above the medium to be measured. Because propagation of electromagnetic waves in air is not significantly different from that in a vacuum, in order to achieve adequate measuring accuracy no particular correction of the signals is required that are reflected through the air and back to the fill-level measuring device by the feed material, the container internals and the container itself.

In process containers of the chemical industry, furthermore, all kind of chemical gases and gas mixtures can be encountered as overlay media. Depending on the physical characteristics of these gases or gas mixtures, the propagation characteristics of electromagnetic waves are changed when compared to propagation in a vacuum or in air.

Furthermore, external influences can act on the overlay medium. Examples of this include changed temperatures and pressures that also result in changed propagation characteristics of the electromagnetic waves.

Moreover, the overlay medium can also be represented by a liquid or a layer of mist, i.e. a saturated gas atmosphere, in which minute liquid particles are distributed. Depending on the predetermined characteristics, the propagation characteristics of electromagnetic waves change in turn.

If the influences the overlay medium has on the propagation characteristics of the signals that are used for measuring in the fill-level measuring device are not adequately taken into account, clear measuring errors result that lead to unsatisfactory measuring results.

The following discussion concentrates on the very important field of fill-level measuring by means of electromagnetic waves. It should be pointed out that even in the use of acoustic waves there may be significant influences the overlay medium has on the propagation characteristics of the wave. Acoustic waves are also influenced in their propagation by various media, by temperature, pressure or mist. It is possible to transpose the following exemplary embodiments of the invention for determining the characteristics of the overlay medium, which characteristics result in changed propagation characteristics, from the application of electromagnetic waves to the application of acoustic waves.

Compensating the influences an overlay medium has on the propagation characteristics of a signal used for fill-level measuring is possible in various ways.

FIG. 1 shows an arrangement for fill-level measuring. The container 100 comprises a liquid 106 to a fill level height $d_B$-$d_L$. It is assumed that the space above the liquid 107 is first filled with air.

Below, it should be defined that the medium which is situated between the position of emission of the signals used by the fill-level measuring device (101) for the purpose of measuring and the surface 105 used for measuring can be designated the overlay medium. Thus, the term "overlay medium" refers, for example, to the medium or the media that is/are situated between the source of the measuring signal of the fill-level measuring device and the surface to be measured, through which medium/media the transmitted signal and/or the received signal travel/travels. Essentially, this can, for example, be the container atmosphere. In the present case the liquid in the container is covered with air as an overlay medium.

By means of a high-frequency unit 102 the fill-level measuring device 101 generates an electromagnetic pulse 103 and couples the latter to a waveguide 104, after which this pulse propagates along the waveguide almost at the speed of light in the direction of the feed material surface 105 to be measured.

In the present example the waveguide is designed in the form of a bar. Of course any of the waveguides described in the literature, and thus in particular double wire lines, multi-wire lines or coaxial guides, can be used. The feed material surface 105 reflects part of the incoming signal energy, after which the reflected signal component propagates along the waveguide 104 and back to the fill-level measuring device 101. The non-reflected signal component enters the liquid 106, and within it propagates at considerably reduced speed along the waveguide 104. The speed $c_{Medium}$ of the electromagnetic wave 103 within the liquid 106 is determined by the material characteristics of the liquid 106:

$$c_{Medium} = \frac{c_0}{\sqrt{\varepsilon_R \cdot \mu_R}}$$

wherein $c_0$ denotes the speed of light in the vacuum, $\epsilon_R$ denotes the permittivity value of the liquid, and $\mu_R$ denotes the permeability value of the liquid. At the lower end 108 of the waveguide 104 the remaining signal component is also reflected, and after a corresponding transit time returns to the fill-level measuring device 101. In the fill-level measuring device the incoming signals are processed by means of the high-frequency unit 102, and are preferably transformed to a lower-frequency intermediate frequency range. By means of an analog-digital converter unit 109 the analog echo curves provided by the high-frequency unit 102 are digitized and made available to an evaluation unit 110. The evaluation unit 110 analyzes the digitized echo curve, and based on the echo contained therein, according to known methods determines that echo which has been generated by the reflection from the feed material surface 105. Moreover, the evaluation unit determines the exact distance to this echo. Furthermore, the exact distance to the echo is corrected in such a manner that influence the overlay medium 107 has on the propagation of the electromagnetic waves is compensated. The compensated distance to the feed material 113, which distance has been calculated in this manner, is provided to an output unit 111 which further processes the particular value according to the specifications of the user, for example by linearization, offset correction, conversion to a filling height $d_B$-$d_L$. The processed measured value is provided towards the outside on an external communication interface 112. Any established interfaces can be used for this purpose, in particular 4.20 mA current interfaces, industrial field buses such as HART, Profibus, FF, or computer interfaces such as RS232, RS485, USB, Ethernet, FireWire.

Figure 2:
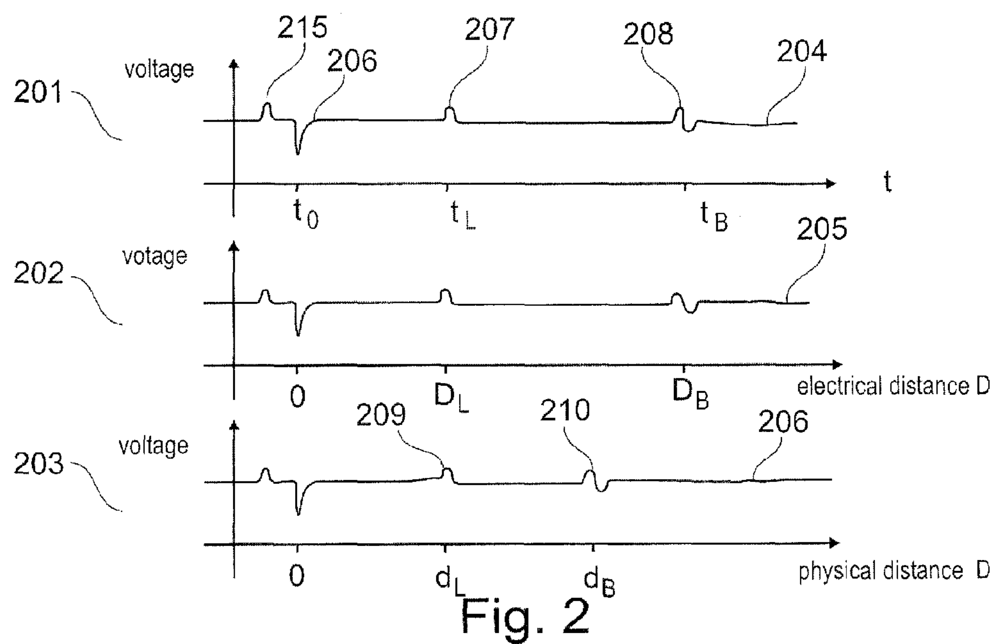
FIG. 2 shows an evaluation of echo signals.

FIG. 2 again illustrates in detail important steps that can be used in the context of echo signal processing in the evaluation unit 110 to compensate for influences of various media.

Curve 201 first shows the echo curve 204 which has been acquired by the analog-digital converter unit 109 over time. The echo curve first comprises the transmission pulse 205. A short time later, at the point in time $t_0$, a first reflection 206 is acquired which has been caused by coupling the high-frequency signal into the waveguide 104. A further reflection 207 is derived from the feed material surface 105 and is acquired at the point in time $t_L$. Finally, the echo 208 generated by the lower end 108 of the waveguide 104 is acquired at the point in time $t_B$.

In a first processing step the time-dependent curve 201 is transformed to a distance-dependent curve 202. During this transformation it is assumed that the acquired curve has formed exclusively by propagation in a vacuum. By multiplication with the speed of light in the vacuum, the ordinate of the illustration 201 is converted to a distance axis. Furthermore, calculating an offset results in the echo 206 caused by coupling-in the high-frequency signal obtaining the distance value of 0 m.

The second illustration 202 shows the echo curve as a function of the electrical distance D. The electrical distance corresponds to the distance which an electromagnetic wave in a vacuum covers in a given time. The electrical distance does not take into account any influences of a medium, which influences may possibly result in slower propagation of the electromagnetic waves. The curve 202 thus represents a non-compensated-for echo curve that is, however, connected to locations.

In the present application electrical distances are always designated by upper-case characters D, whereas physical distances that can be measured directly on the container are designated by lower-case characters d.

It may, furthermore, be possible to essentially fully compensate the echo curve 205. The third illustration 203 shows a fully compensated echo curve 206. In order to obtain an illustration of the echoes above the physical distance, in the present case the influence of the overlay medium 107 in the region between locations 0 and DL (curve 202) needs to be taken into account. The electrical distance indications of the abscissa between 0 and $D_L$ need to be converted to physical distance indications according to the following context:

$$d_i = \frac{D_i}{\sqrt{\varepsilon_L \cdot \mu_L}}$$

Since $\in_L$ and $\mu_L$ in good approximation correspond to the value 1, in the present example no correction needs to be made in relation to this section. The electrical distance indications of the abscissa between $D_L$ and $D_B$ need, however, to be converted to physical distance indications according to the following context:

$$d_i = d_L + \frac{(D_i - D_L)}{\sqrt{\varepsilon_M \cdot \mu_M}}$$

The third illustration 203 finally shows the corrected gradient. Both the distance to the echo of the feed material surface 209 and the distance of the echo 208, 210 generated by the lower end 108 of the waveguide 104 correspond to the distances 113, 114 that can be measured on the container 100.

At this stage it should be pointed out that within the context of signal processing, conversion in curve 202, in other words determination of the electrical distances of various echoes, can be carried out in the device in relation to all the echoes. Conversion of the echo curve to a compensated echo curve is generally speaking not carried out, because correction of a single fill-level value is sufficient.

For the application of FIG. 1 in relation to the distance between the sensor and the feed material surface, due to values relating to the permittivity number and the permeability number of the air being known in advance, there are no problems in practical application.

Figure 3:
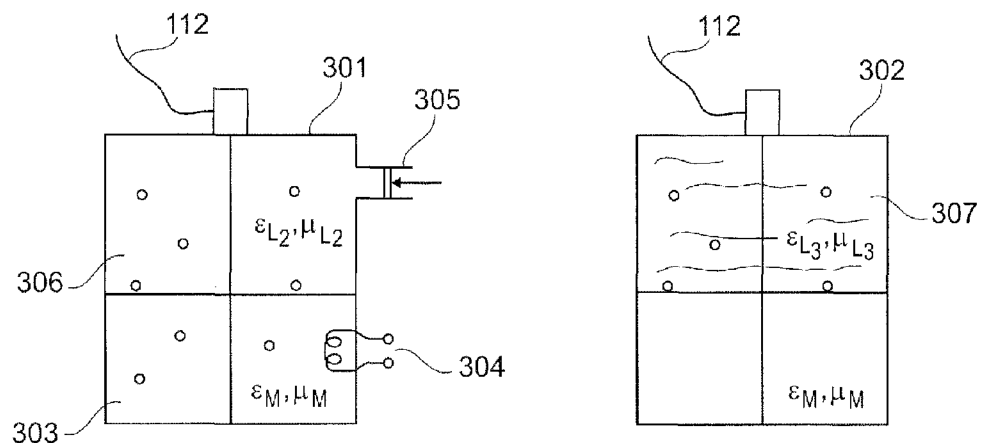
FIG. 3 shows an arrangement for measuring in steam pressure atmospheres.

In contrast to the above, FIG. 3 shows two applications that require correction. Container 301 shows the case of a saturated steam application. The liquid 303 contained in the container can be heated by means of a heater 304 and commences to vaporize. At the same time it is possible to change the pressure in the container by way of a pressure generating device 305 during the operating phase. Due to the laws of physics, as a result of these boundary conditions the values relating to the permittivity number and the permeability number of the overlay atmosphere 306 change during the operating phase of the sensor. Furthermore, a measurement in a container 302 is possible in which container a chemical gas or a gas mixture 307 serves as an overlay atmosphere. Generally speaking the values relating to the permittivity number and to the permeability number of the overlay atmosphere are not known in this case either.

Figure 4:
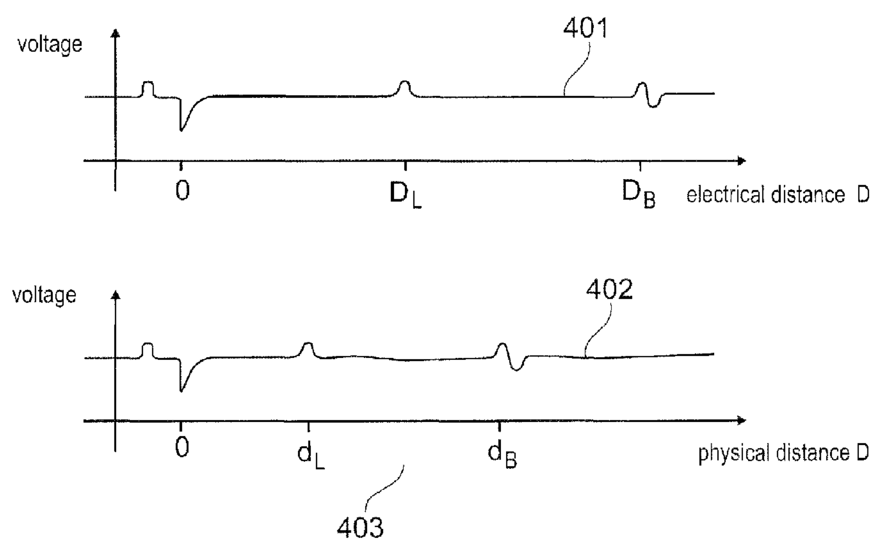
FIG. 4 shows an evaluation of echo signals in steam pressure atmospheres.

FIG. 4 shows the partially compensated echo curve 401, as it can be acquired by the sensor by means of the application 301, 302 with an overlay atmosphere other than air. While the evaluation unit 110 may be in a position to determine the electrical distance $D_L$ to the feed material, however any correction of this distance, and thus any calculation of the associated physical distance $d_L$ 403, is not possible without knowledge of the material characteristics of the overlay atmosphere.

In order to nevertheless be able to automatically correct the material characteristics of the overlay atmosphere, manual input of the characteristic values of the material characteristics by the user can be considered. Apart from its startup that lacks convenience, this method can cause problems whenever the material characteristics of the overlay atmosphere during operation change. It may be possible to acquire the pressure and the temperature with separate sensors in order to determine the material characteristics in this manner. However, this results in increased requirements in relation to the devices to be used.

Figure 5:
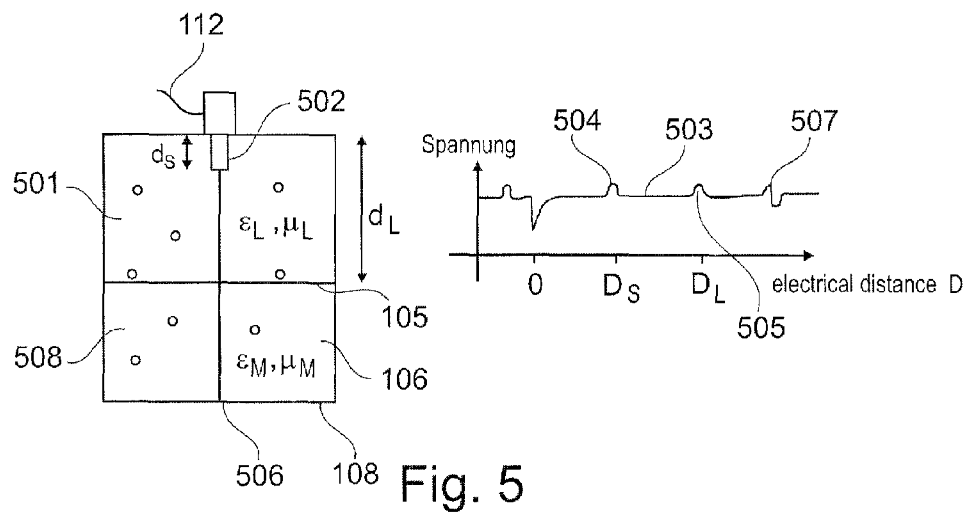
FIG. 5 shows an arrangement with a compensation echo.

Thus in the context of fill-level measuring it is possible to use an arrangement as shown in FIG. 5. The arrangement is constructed in such a manner that at a physical distance $d_S$ known in advance a defined interference position 502 is affixed. By means of the echo curve 503 acquired by the sensor the electrical distance $D_S$ of the associated echo 504 can be determined. It is thus possible to continuously determine the product of the material characteristics of the overlay atmosphere according to $$\varepsilon_L \cdot \mu_L = \left(\frac{D_S}{d_S}\right)^2$$

Conversion of the determined electrical distance $D_L$ of the fill level echo 505 to the associated physical distance $d_L$ can easily be achieved by means of the characteristic value determined above.

In practical application problems can be caused by the use of one or several reference echoes. On the one hand a large part of the signal energy on the reference echo can already be reflected and is thus no longer available for measuring the actual fill-level echo. On the other hand there is a problem in that in the case of the reference echo being covered by the feed material, measuring the material characteristics is no longer possible or is possible only with difficulty. Furthermore, as a result of the overlay of the reference echo and the feed material echo, the accuracy of fill-level measuring is significantly diminished.

Furthermore, methods are possible that do not implement the principle of reference echo measuring described above by means of an artificially introduced reflection position 502, but instead as a reference echo evaluate the reflection 507 of the end of the waveguide 506. In practical application this approach can fail in that due to very good reflection characteristics of the medium 508 only a very small part of the signal energy generated by the sensor reaches the end of the waveguide 506 at all, and consequently the amplitude of the generated echo is so small that it can no longer be evaluated by means of the received echo curve 503.

Figure 6:
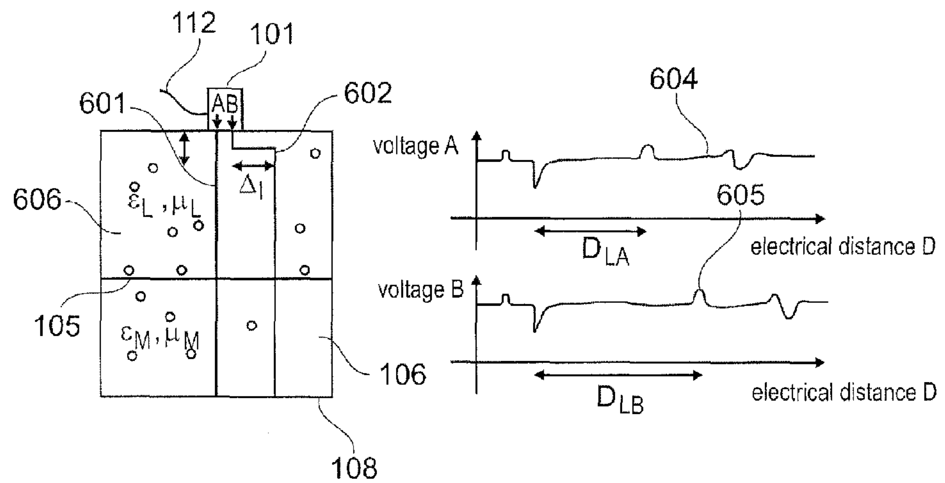
FIG. 6 shows a fill-level measuring arrangement according to an exemplary embodiment of the invention.

FIG. 6 shows a device according to an exemplary embodiment of the invention. The device comprises a first waveguide 601 and a second waveguide 602 that differs in its physical length from the first waveguide by a corresponding geometrical design. Of course, at this point all the embodiments of known waveguides can be used, in particular double-wire lines, multi-wire lines or coaxial guides.

The fill-level measuring device then either concurrently or consecutively carries out two separate measurements A and B. The reflections of measurement A, which is carried out by means of the waveguide 601, are acquired by the fill-level measuring device and are further analyzed, in the form of a digitized echo curve 604, in the evaluation unit 110. The evaluation unit 110 (see FIG. 1) in particular determines, according to known methods, the electrical distance $D_{LA}$ to the surface of the medium to be measured. Furthermore, the reflections of the measurement B, which is carried out by means of the waveguide 602, are acquired by the fill-level measuring device and in the form of a further digitized echo curve 605 are further analyzed in the evaluation unit 110. The evaluation unit 110 again according to known methods determines the electrical distance $D_{LB}$ to the surface of the medium to be measured. Based on these values and the difference in length $\Delta l$, known from the factory, between the two waveguides, the product of the material characteristics of the overlay atmosphere 606 can be determined as follows:

$$\varepsilon_L \cdot \mu_L = \left(\frac{D_{LB} - D_{LA}}{\Delta l}\right)^2$$

Based on the material characteristic determined, subsequently, for example in the evaluation unit 110, determining the physical distance to the feed material surface takes place according to known methods.

Figure 7:
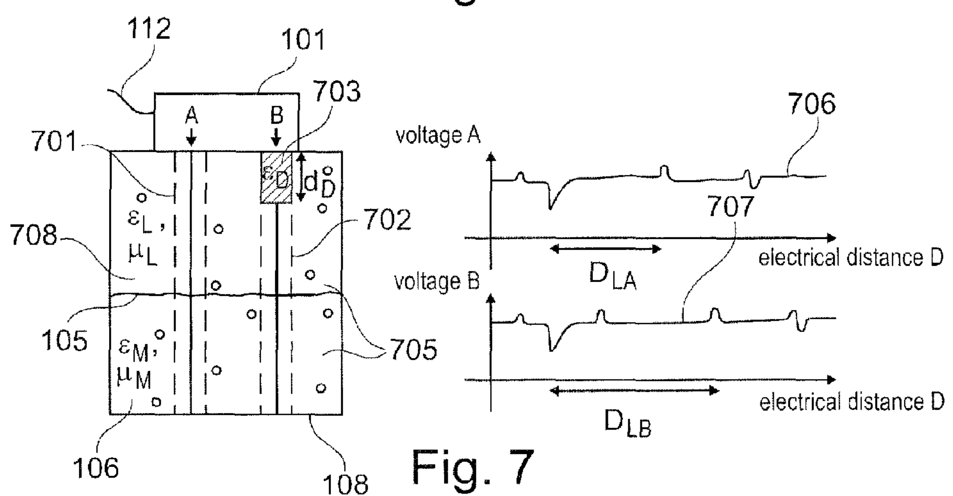
FIG. 7 shows a fill-level measuring arrangement according to a further exemplary embodiment of the invention.

FIG. 7 shows a device according to a further exemplary embodiment of the invention. The device comprises a first waveguide 701 and a second waveguide 702 that comprises the same geometric length, but that by means of design measures is constructed in such a manner that a signal generated by the high-frequency unit 102 requires a greater time span for covering the distance to the feed material surface 105 than is the case in a comparable measuring process in the first waveguide 701. In the present exemplary embodiment two coaxial guides are used as a waveguide, wherein the second coaxial guide 702 in the upper region comprises a known dielectric material 703 along a length that has been defined in advance. Along their longitudinal extension the coaxial guides comprise regularly arranged openings to the container space 705 in order to prevent the medium from entering the waveguide. Of course, at this position any of the embodiments of known waveguides can be used, and thus in particular double-wire lines, multi-wire lines or individual lines.

The fill-level measuring device according to the invention now concurrently or consecutively carries out two separate measurements A and B. The reflections of measurement A, which measurement is carried out by means of the waveguide 701, are acquired by the fill-level measuring device and in the form of a digitized echo curve 706 are further analyzed in the evaluation unit 110. The evaluation unit 110 determines according to known methods, in particular, the electrical distance $D_{LA}$ to the surface of the medium to be measured. Furthermore, the reflections of measurement B, which measurement is carried out by means of the waveguide 702, are acquired by the fill-level measuring device and are analyzed, in the form of a further digitized echo curve 707, in the evaluation unit 110 (see FIG. 1). The evaluation unit 110 determines according to known methods the electrical distance $D_{LB}$ to the surface of the medium to be measured. The product of the material characteristics of the overlay atmosphere 708 can be determined as follows on the basis of these values, of the dielectric constant $\in_D$ of the dielectric material 703, which dielectric constant $\in_D$ is known from the factory, and of the length $d_D$ of the dielectric material, which length $d_D$ is known from the factory:

$$\varepsilon_L \cdot \mu_L = \left(\sqrt{\varepsilon} - \frac{D_{LB} - D_{LA}}{d_D}\right)^2$$

Based on the determined material characteristic, subsequently determination of the physical distance to the feed material surface is carried out according to known methods.

Figure 8:
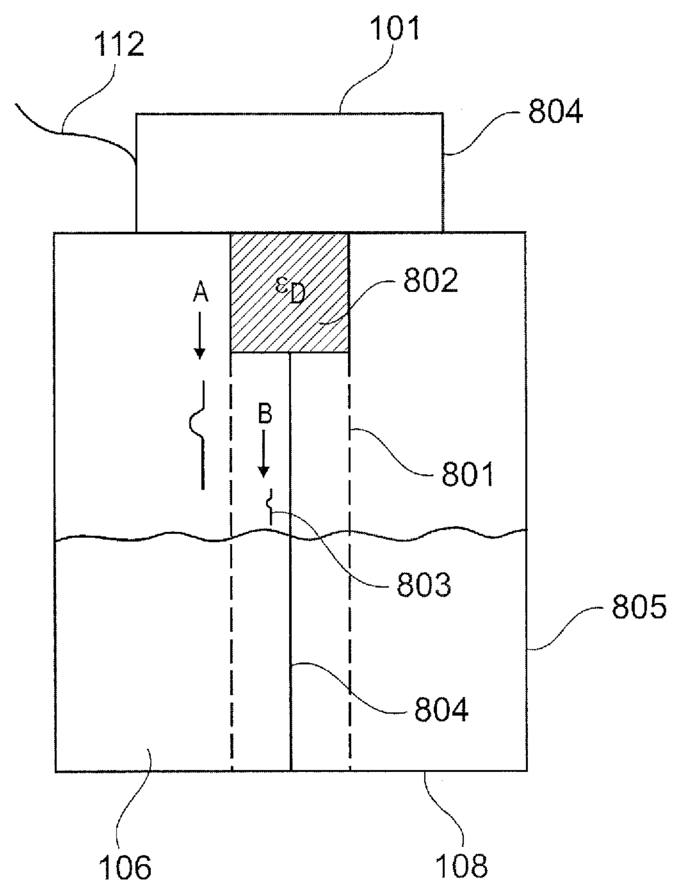
FIG. 8 shows a fill-level measuring arrangement according to a further exemplary embodiment of the invention.

FIG. 8 shows a device according to a further exemplary embodiment of the invention. This variant uses a single probe for measuring two measuring channels on a single coaxial guide. In the interior of the coaxial guide 801 a dielectric material 802 ensures delay of the signal 803. The measurement A on the outer surface of the coaxial guide 801 remains uninfluenced by this change in the interior. The shown variant represents a particularly advantageous embodiment because the fill-level measuring device (804) according to the invention in this case too only occupies a single process opening of the container 805.

Furthermore, it is possible, by combining various materials, to construct a further variant according to FIG. 8, which variant without the use of a full-surface dielectric material implements different transit times along the probe.

Figure 9:
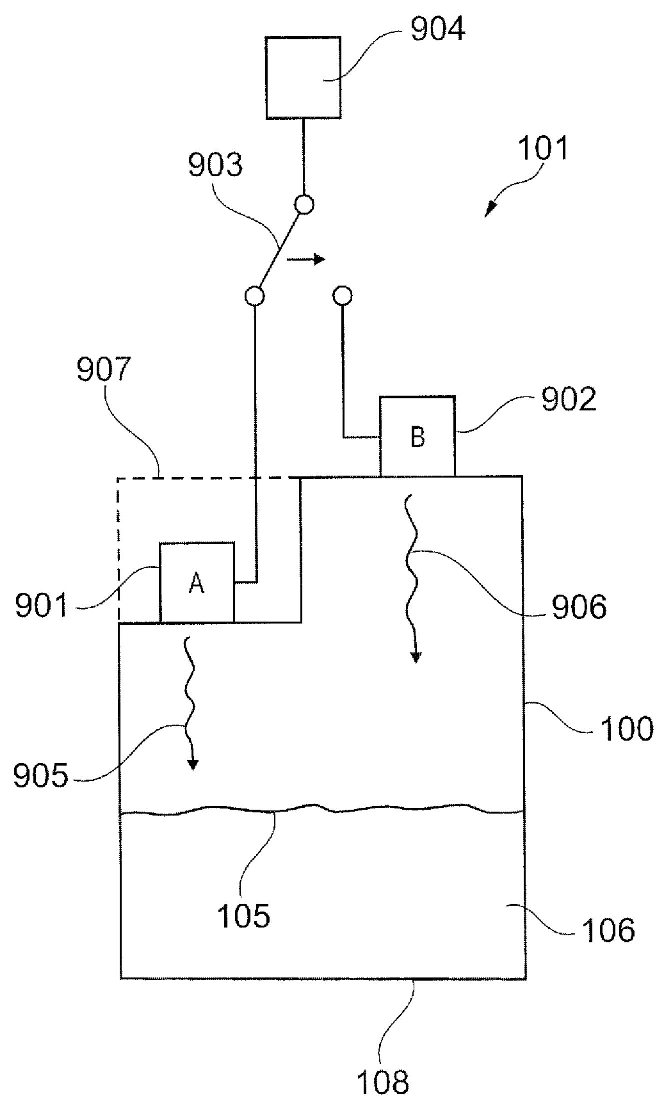
FIG. 9 shows a fill-level measuring arrangement according to a further exemplary embodiment of the invention.

FIG. 9 shows a fill-level measuring arrangement comprising a fill-level measuring device 101 that is used for measuring the fill level in a container 100.

Two fill-level probes 901, 902 are provided, which are arranged offset relative to each other at different heights above the feed material surface 105. To this effect the top of the container comprises, for example, a stepped shape. It is, of course, also possible for the lower probe 901 to be affixed in the container (indicated by the dashed line 907), whereas the upper probe 902 is affixed in the region of the container ceiling.

The two probes 901, 902 are, for example, fill-level radar antennae or ultrasound antennae that emit an electromagnetic or acoustic transmission signal 905 or 906 towards the feed material surface 105.

The two signals 905, 906 cover different distances in the container atmosphere, i.e. through the overlay medium situated above the feed material surface 105.

The two probes 901, 902 are connected to the transmission signal generating and receive signal evaluation device 904 by way of a separating filter 903. In this manner the two probes 901, 902 can alternately transmit and receive without this requiring two separate electronics arrangements 904.

Figure 10:
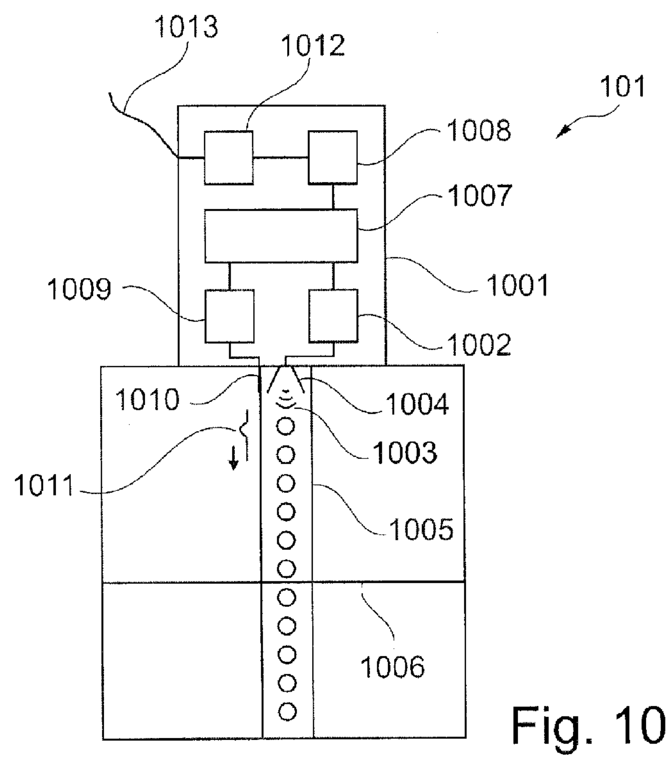
FIG. 10 shows a fill-level measuring arrangement according to a further exemplary embodiment of the invention.

FIG. 10 shows a device according to a further exemplary embodiment of the invention. The fill-level measuring device 101 emits the radar wave 1003, which has been generated in a first high-frequency unit 1002, by way of an antenna 1004 to the interior of a standpipe 1005. As a result of the reflection on the feed material surface 1006 the fill-level measuring device 1001 is in a position to form an echo curve according to the known state of the art, and to digitize said echo curve by means of the analog-digital converter unit 1007. By means of this digitized echo curve the evaluation unit 1008 determines at least one characteristic value relating to the level of the feed material surface 1006.

In addition it should be pointed out that this first determination of a fill level in the interior of a standpipe can be implemented with various measuring principles. Examples include fill-level measuring on the basis of ultrasound or laser, or fill-level measuring by means of conductive or capacitive measuring of the interior space of the standpipe.

Furthermore, the fill-level measuring device 1001 is designed, by means of a second high-frequency unit 1009, to generate an electromagnetic pulse 1011, and to guide the aforesaid by means of suitable coupling 1010 to the outside of the standpipe 1005. The electromagnetic pulse 1011 moves along the surface of the standpipe 1005 and is reflected by the surface 1006 of the medium to be measured. The second high-frequency unit 1009 according to known methods prepares an echo curve from the reflected signals, which echo curve is digitized in the analog-digital converter unit 1007. By means of this digitized second echo curve the evaluation unit 1008 determines at least one characteristic value relating to the level of the feed material surface 1006.

Furthermore, the evaluation unit 1008 is in a position, with the use of at least one of the previously determined characteristic values, to determine at least one characteristic value relating to the level of the feed material surface 1006, which characteristic value after further offsetting by the evaluation unit 1012 is provided on one of the known interfaces 1013.

It is also possible for the evaluation unit 1008 to determine extended information on the basis of the two measurements, with such information including, among other things: ASSET information, reliability of the measurement, dirt buildup in the standpipe, etc.

Moreover, it should be pointed out that the construction of the standpipe (1005) comprising several holes represents only one special variant. Also imaginable are designs without holes, with slits, with irregularly distributed openings, etc.

Figure 11:
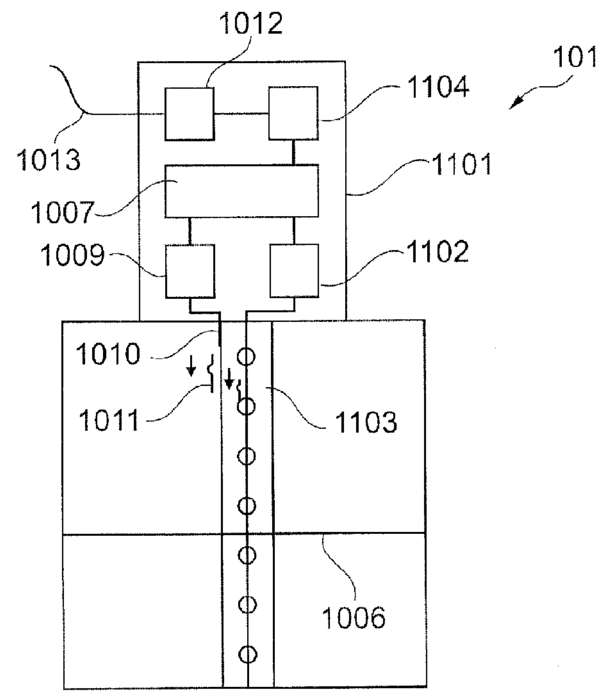
FIG. 11 shows a fill-level measuring arrangement according to a further exemplary embodiment of the invention.

FIG. 11 shows a device according to a further exemplary embodiment of the invention. In this variant the standpipe is formed by a coaxial guide 1103 that forms part of the fill-level measuring device 1101. The level 1006 of the liquid in the interior of this guide is determined by means of a second electromagnetic pulse, which is generated by a third high-frequency unit 1102. The second high-frequency unit 1009 corresponds to the one in FIG. 5; it is used, according to the method presented above, to measure the level 1006 of the liquid along the outer surface of the standpipe 1103. Thus, the embodiment shown uses two independent measurements according to the principle of the guided microwave for determining the fill level.

Figure 12:
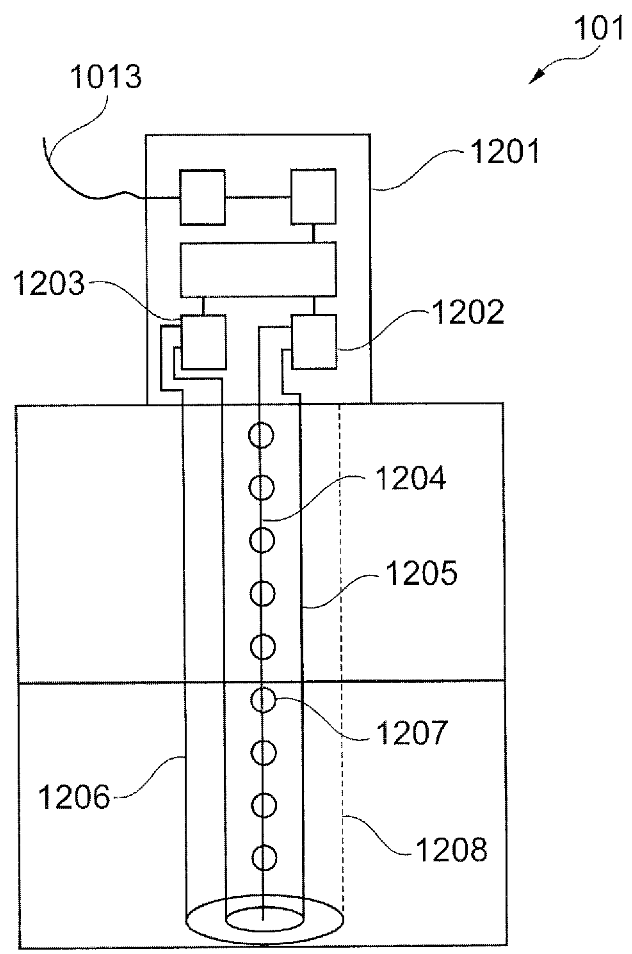
FIG. 12 shows a fill-level measuring arrangement according to a further exemplary embodiment of the invention.

FIG. 12 shows a device according to a further exemplary embodiment of the invention. The fill-level measuring device 1201 again comprises two independent high-frequency units 1202, 1203 that are used to measure the fill level in two different ways according to the principle of the guided microwave. The first measurement utilizes the inner coaxial guide (inner guide 1204, outer guide 1205) for determining the fill level. The second measurement uses the outer coaxial guide, which comprises the casing pipe 1206 as an outer guide, and the pipe 1205 as an inner guide, for determining a fill-level value. In the present case the inner coaxial guide and the outer coaxial guide comprise regular holes that make it possible for the liquid to be measured to enter. Of course, this represents only one concrete embodiment.

It should herewith be disclosed that the fundamental idea of the present invention can be implemented with arrangements according to FIGS. 10, 11 and 12. It may be possible for the average person skilled in the art to modify and/or supplement the disclosed arrangements of FIGS. 10, 11 and 12 in such a manner that with them different transit times of the signals in two different measuring channels can be implemented. For example, it may always be possible to slow down the propagation in a particular signal path by incorporating dielectric materials.

Figure 13:
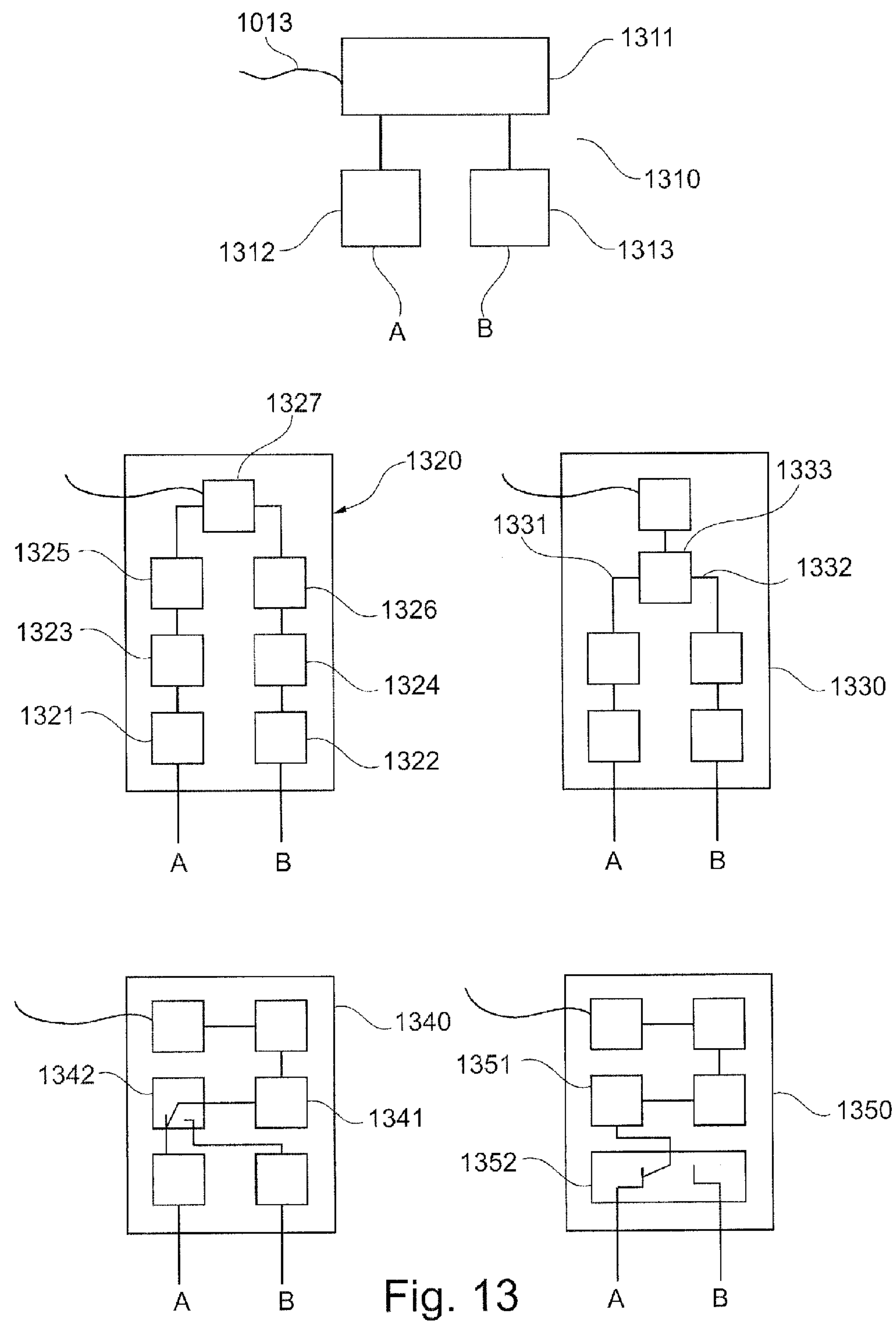
FIG. 13 shows evaluation devices for a fill-level measuring device according to further exemplary embodiments of the invention.

FIG. 13 shows various evaluation units 110 according to further exemplary embodiments of the invention relating to a device for fill-level measuring. In contrast to the variants of different probes presented above, some imaginable embodiments of corresponding device electronics are presented below.

It should be noted that in the illustrations of FIG. 13 the probe connections of the hitherto-presented probes are abstracted by the letters A and B.

It is possible to implement a device according to the invention by combining two complete electronics modules 1312, 1313 of conventional fill-level measuring devices 101. The electronics modules may operate according to different principles, suitable for designing the probe couplings used on the connections A and B. A higher-order evaluation unit 1311 offsets the individual fill-level values (from measurements A and B), which fill-level values have been provided by the electronics modules 1312, 1313, and from these forms at least one measured value that is provided at an external interface 1013.

Illustration 1320 shows the design of a further electronics variant. The functionality of this variant corresponds to that of illustration 1310, wherein the high-frequency generating unit 1321, the analog-digital converter unit 1323, and the evaluation unit 1325 combined are able to carry out a first measurement; and, furthermore, the high-frequency generating unit 1322, the analog-digital converter unit 1324, and the evaluation unit 1326 combined are able to form a second measured value. The measured values are offset against each other by a suitable program logic in the output unit 1327 and are provided towards the outside. It should be pointed out that in this structure measurement B can also be implemented according to an alternative measuring principle. The high-frequency unit 1322 then needs to be replaced by a suitable unit (laser generating unit, ultrasound generating unit).

A further implementation variant according to illustration 1330 corresponds to the one from illustration 1320, however, it uses a shared evaluation unit 1333 for evaluation of the digitized echo curves that are provided at the connections 1331 and 1332.

Furthermore, it may also be possible to convert the signals to digital presentation by means of a single analog-digital converter unit according to arrangement 1340. Apart from the analog-digital converter unit 1341 to this effect the device comprises an analog switch 1342 that transmits the analog low-frequency signals in a time-division multiplex method to the analog-digital converter unit 1341.

Moreover, the arrangement 1350 advantageously utilizes the existing structure of an available high-frequency unit 1351 of a sensor, and supplements the aforesaid by a high-frequency modulator 1352. With this variant a particularly simple design of a device according to the present invention can be achieved.

Furthermore, various coatings of the probe in the interior and/or in the exterior may be suitable to cause a different transit time of the signals.

Figure 14:
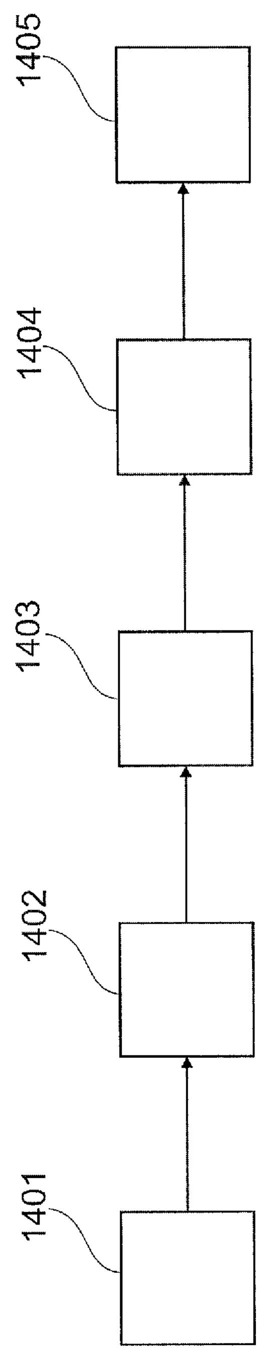
FIG. 14 shows a flow chart of a method according to an exemplary embodiment of the invention.

FIG. 14 shows a flow chart of a method according to an exemplary embodiment of the invention. In step 1401 a first echo curve is acquired, and in step 1402 a second echo curve is acquired. The two echo curves reflect the reflection conditions along a first measured line or along a second measured line, wherein the signals used, on their way to the feed material surface, cover different electrical distances, and thus require different transit times.

In step 1403 the first echo curve is evaluated, and in step 1404 the second echo curve is evaluated. This can, for example, take place within the same evaluation electronics. In step 1405, from the two results of these evaluations, characteristic values are calculated that are connected to the overlay medium. These characteristic values are, for example, the product of permittivity and permeability of the overlay medium. With the use of these characteristic values, precise fill-level calculation then takes place in step 1405.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A fill-level measuring device operating according to a transit time method, comprising:

an echo-curve acquisition device acquiring a first echo curve and a second echo curve, the first echo curve representing the reflection conditions along a first measuring path along which a first measuring signal moves towards a filling material surface or separating layer surface, the second echo curve representing the reflection conditions along a second measuring path along which a second measuring signal moves towards a filling material surface or separating layer surface, the two measuring signals requiring different transit times to reach the filling material surface or separating layer surface; and an evaluation device evaluating the first echo curve and the second echo curve in order to, from them, calculate at least one characteristic value relating to a covering medium that is situated above the filling material surface or separating layer surface.

2. The fill-level measuring device according to claim 1, wherein the first and/or the second measuring signal are/is an electromagnetic signal or an acoustic signal.

3. The fill-level measuring device according to claim 1, wherein the first measuring path and the second measuring path comprise different lengths.

4. The fill-level measuring device according to claim 1, wherein the echo-curve acquisition device includes a first fill-level probe for generating the first echo curve and a second fill-level probe for generating the second echo curve.

5. The fill-level measuring device according to claim 1,wherein the at least one characteristic value is selected from the group comprising permeability, permittivity, pressure, temperature, and degree of saturation.

6. The fill-level measuring device according to claim 1, wherein the echo-curve acquisition device includes a first waveguide and a second waveguide, wherein the first measuring path extends along the first waveguide; and wherein the second measuring path extends along the second waveguide whose physical length differs from that of the first waveguide.

7. The fill-level measuring device according to claim 1, wherein the evaluation device is designed for calculating the product of permittivity and permeability of the covering medium above the filling material surface or separating layer surface in order to calculate the position of the filling material surface or the position of the separating layer.

8. The fill-level measuring device according to claim 1, wherein the echo-curve acquisition device includes a first waveguide and a second waveguide, wherein the first measuring path extends along the first waveguide and wherein the second measuring path extends along the second waveguide whose physical length is identical to that of the first waveguide.

9. The fill-level measuring device according to claim 8, wherein the second waveguide comprises a dielectric material so that the transit time of the second measuring signal along the second measured line is extended.

10. The fill-level measuring device according to claim 1, wherein the echo-curve acquisition device comprises a single coaxial waveguide for guiding the two measuring signals; wherein the first measuring signal is guided along the outer surface of the coaxial waveguide; and wherein the second measuring signal is guided in the interior of the coaxial waveguide.

11. The fill-level measuring device according to claim 10, wherein the interior of the coaxial waveguide is at least in part filled with a dielectric material so that the transit time of the second measuring signal along the second measuring path is longer than the transit time of the first measuring signal along the first measuring path.

12. A fill-level measuring arrangement for measuring the fill level in a container, comprising:

a fill-level measuring device includes (a) an echo-curve acquisition device acquiring a first echo curve and a second echo curve, the first echo curve representing the reflection conditions along a first measuring path along which a first measuring signal moves towards a filling material surface or separating layer surface, the second echo curve representing the reflection conditions along a second measuring path along which a second measuring signal moves towards a filling material surface or separating layer surface, the two measuring signals requiring different transit times to reach the filling material surface or separating layer surface; and (b) an evaluation device evaluating the first echo curve and the second echo curve in order to, from them, calculate at least one characteristic value relating to a covering medium that is situated above the filling material surface or separating layer surface; and a container receiving a filling material whose fill level is to be determined by the fill-level measuring device.

* * * * *